United States Patent
Iwanade et al.

(10) Patent No.: US 8,476,188 B2
(45) Date of Patent: Jul. 2, 2013

(54) CLOTH-LIKE RADIOACTIVE MATERIAL ADSORBENT AND ITS MANUFACTURING METHOD

(75) Inventors: Akio Iwanade, Takasaki (JP); Noriaki Seko, Takasaki (JP); Hiroyuki Hoshina, Takasaki (JP); Yuji Ueki, Takasaki (JP); Seiichi Saiki, Takasaki (JP)

(73) Assignee: Japan Atomic Energy Agency, Ibaraki (JP)

( * ) Notice: Subject to any disclaimer, the term of this patent is extended or adjusted under 35 U.S.C. 154(b) by 2 days.

(21) Appl. No.: 13/487,718

(22) Filed: Jun. 4, 2012

(65) Prior Publication Data
US 2012/0329637 A1 Dec. 27, 2012

(30) Foreign Application Priority Data
Jun. 20, 2011 (JP) ................. 2011-136558

(51) Int. Cl.
*B01J 20/26* (2006.01)
(52) U.S. Cl.
USPC .............. 502/402; 558/7; 558/13; 442/395
(58) Field of Classification Search
USPC ........... 588/7, 13; 252/184; 75/392; 502/402; 424/409
See application file for complete search history.

(56) References Cited

U.S. PATENT DOCUMENTS
2002/0121470 A1* 9/2002 Mann et al. .................. 210/287

FOREIGN PATENT DOCUMENTS
JP 2006-026588 2/2006
JP 2007-271306 10/2007

OTHER PUBLICATIONS

F. Sebesta, Composite sorbents of inorganic ion-exchangers and polyacrylonitrile binding matrix, Journal of Radioanalytical and Nuclear Chemistry, vol. 220, No. 1 (1997) 77-88.*
"Radioactivity Analysis of Sea Water", analysis of gamma-ray emitting radionuclide, Japan Chemical Analysis Center.

* cited by examiner

*Primary Examiner* — Colleen Dunn
*Assistant Examiner* — Haytham Soliman
(74) *Attorney, Agent, or Firm* — Brundidge & Stanger, P.C.

(57) ABSTRACT

A renewable adsorbent enabling to adsorb cesium selectively and efficiently, and to reuse cesium by eluting adsorbed cesium, and its manufacturing method are provided. Polyethylene (PE)/polypropylene (PP) based non-woven fabric may be exposed with electron beam, PE/PP based non-woven fabric to which electron beam was exposed is contacted to the monomer solution containing acrylonitrile (AN), dimethyl sulfoxide (DMSO), Tween80 (polyoxyethylene sorbitan monooleate) as a surfactant, and AMP (ammonium molybdophosphate n-hydrate) as an inorganic ion exchanger, and then the inorganic ion exchanger (AMP) is supported directly by the non-ionic graft chain.

6 Claims, 2 Drawing Sheets

CLOTH-LIKE RADIOACTIVE MATERIAL ADSORBENT AND ITS MANUFACTURING METHOD

BACKGROUND OF THE INVENTION

The present invention relates to an adsorbent and its manufacturing method which allows specific radioactive materials to be adsorbed from the liquid including the radioactive materials such as cesium and strontium that may be spread, for example, due to the accidental incidences at nuclear power plants and radioactive material handling facilities.

In recent years, several adsorbents which are used for removing specific radioactive materials such as cesium and strontium from the liquid has been proposed. (for example, refer to Patent Document 1). As for the technology using the similar method to the present invention, such an adsorbent is also known as graft chain formed by irradiation to polyethylene (PE) based non-woven fabrics or polyethylene (PE)/polypropylene (PP) based non-woven fabrics, and then chelate group may be introduced to the grafts so formed in order to adsorb and remove the specific metallic elements from hot spring water (for example, refer to Patent Document 2). In addition, such a technology is known for selectively precipitating cesium in the seawater as the acidic seawater by adding hydrochloric acid, and then the powdered ammonium molybdate may be added to the seawater and stirred together (for example, refer to Non-Patent Document 1).

PRIOR ART REFERENCE

[Patent Document]
 [Patent Document 1] JP 2007-271306 A
 [Patent Document 2] JP 2006-26588 A
[Non-Patent Document]
 [Non-Patent Document 1] "Radioactivity Analysis of Sea Water", analysis of gamma-ray emitting radionuclide, Japan Chemical Analysis Center (a reference published via electric telecommunication line)

BRIEF SUMMARY OF THE INVENTION

The adsorbent disclosed in Patent Document 1 described above, however, removes cesium and strontium by using any special microorganism, and thus has such an disadvantageous feature as a large scale apparatus like bioreactor tower may be required as well as it may be difficult to collect the adsorbent used once and it is impossible to renew the used adsorbent even if collected. The adsorbent disclosed in Patent Document 1 described above may be renewable, though this adsorbent has a lower surface coverage as the adsorbent for adsorbing and removing selectively the radioactive materials including, for example, cesium, and thus may not be appropriate for such purposes because its intended use is not intrinsically to adsorb selectively and remove only the radioactive materials. The adsorbent disclosed in Non-Patent Document 1 described above can adsorb selectively cesium in the seawater, though it is not renewable and is substantially developed for analyzing the samples, and thus it is impossible to apply this adsorbent to water purification to be used for swimming pools and fields of rice and other crops because of its geometrical shapes.

An object of the present invention is to provide a renewable adsorbent enabling waste reduction and its manufacturing method which may adsorb selectively and efficiently cesium as one of the major radioactive materials released, for example, at the accident of nuclear power plants and radioactive material handling facilities as well as elute the adsorbed cesium.

The manufacturing method of fabric adsorbent for radioactive element according to one aspect of the present invention comprises;

generating radical by irradiation to polyethylene (PE) based non-woven fabrics or polyethylene (PE)/polypropylene (PP) based non-woven fabrics;

forming graft polymerization product by contacting the non-woven fabrics to the monomer solution manufactured by mixing acrylonitrile (AN), solvent for AN, surfactant and one selected from the group including stannum molybdophosphate, titanium molybdophosphate and ammonium molybdophosphate n-hydrate (AMP) with a relevant weight ratio;

immersing the graft polymerization product in toluene;

washing the non-woven fabrics entirely; and drying in a vacuum the graft polymerization product in which the AMP is supported after completing washing with toluene.

Specifically, the solvent for AN may be preferably dimethyl sulfoxide (DMSO), and the surfactant may be preferably polyoxyethylene sorbitan monooleate (Tween80.) The surfactant is aimed to promote the dispersion of ammonium molybdophosphate into solvent, but is not necessarily required to manufacture the adsorbent.

In fabric radioactive material adsorbent according to another aspect of the present invention, acrylonitrile (AN), solvent for AN, surfactant and one selected from the group including stannum molybdophosphate, titanium molybdophosphate and ammonium molybdophosphate n-hydrate (AMP) are formed by graft polymerization in polyethylene (PE) based non-woven fabrics or polyethylene (PE)/polypropylene (PP) based non-woven fabrics. By using AN and; for example, AMP at the same time, AMP may be supported with high density at the polymer chain formed by polymerization, more specifically, graft polymerization, which allows larger amount of cesium to be adsorbed.

As the adsorbent according to the present invention uses a technology for graft polymerization in the woven or non-woven fabrics and AN monomer including AMP, it will be appreciated that cesium as one of the major radioactive materials released, for example, at the accident of nuclear power plants and radioactive material handling facilities may be adsorbed selectively and efficiently. It is also appreciated that the adsorbent according to the present invention may be renewable as the adsorbed cesium may be eluted selectively.

DETAILED DESCRIPTION OF THE INVENTION

Figure 3:
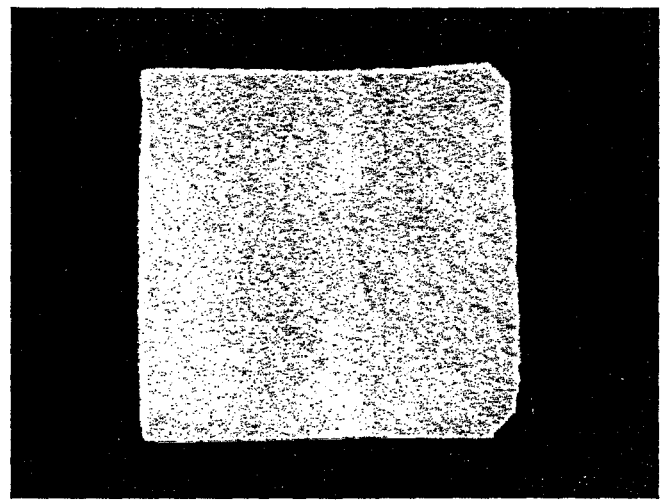
FIG. 3 is a cloth-like cesium adsorbent manufactured by the manufacturing method according to the present invention.

In the followings, a cloth-like or fabric radioactive material adsorbent and its manufacturing method will be described in detail. The adsorbent according to the present invention as shown in FIG. 3 has such a structure that acrylonitrile (AN) may be at least formed by graft polymerization in polyethylene (PE) based non-woven fabrics or polyethylene (PE)/ polypropylene (PP) based non-woven fabrics, and ammonium molybdophosphate n-hydrate (AMP) may be supported by AN polymer chain.

Such adsorbent may be manufactured, for example, as described below. At first, polyethylene (PE)/polypropylene (PP) based non-woven fabrics as the base material may be put into a PP-based bag and then, nitrogen gas (N2) may substitute the air inside the bag. Next, the electron beam of 200 kGy may be exposed onto PE/PP non-woven fabrics in the PP-based bag under the dry-ice temperature condition.

Acrylonitrile (AN), dimethyl sulfoxide (DMSO) as a solvent for AN, polyoxyethylene sorbitan monooleate (Tween80) as a surfactant, and ammonium molybdophosphate n-hydrate (AMP) used for adsorbing cesium selectively are mixed with a relevant weight ratio to obtain a monomer solution. Note that the contents in the containers used in the subsequent processes shall be well stirred when preparing the monomer solution, transporting the solution to the evacuation bottle and distributing the monomer solution to the reacting ampouls so that AMP may be well dispersed in DMSO and AMP may be moved preferably to the container to be used in the subsequent process because AMP is not completely soluble into DMSO.

PE/PP based non-woven fabrics irradiated with an electron beam may be put into the reacting ampouls, and then may be made contact to monomer solution bubbled with N2 gas. After applying contact process for three hours at 50° C., the graft polymerization product may be immersed in toluene and washed in a short period of time. By way of using toluene in the washing process after graft polymerization, it will be appreciated that separation of ammonium molybdophosphate n-hydrate (AMP) may not be broken away. Water-based, alcohol-based or hydrocarbon-based solvent can not support AMP. It should be noted that the washing process may be unsuccessful if any yellow-green pigment is found to flow out from the fabric during the washing process. After the washing process with toluene, the fabric may be dried in air inside the draft and then dried in the vacuum dryer. FIG. 3 shows the fabricated adsorbent.

As will be described later, the adsorbent according to the present invention can adsorb cesium at the environment in the purified water, the pH3 water, and the sea water (refer to Table 1 and Table 2). However, it is proved that molybdenum compound may elute in connection with adsorbent of cesium. Note that Table1 and Table 2 represent a single table, and the right column of Table 1 and the left column of Table 2 represent the identical data, respectively, for better understanding.

Though the surfactant (Tween80) used in the above described manufacturing process, a practical adsorbent performance may be attained even if not using the surfactant (refer to Table 1 and Table 2 as described later.) In addition, though the reaction process is maintained for three hours at 50° C. for manufacturing the graft polymerization product from the non-woven fabric and the monomer, a larger amount of graft polymerization product may be obtained by using the reaction process during a longer time (for example, six hours) (refer to No. 11 and No. 12 in Table1 and Table2 as described later.) In addition, though radical is generated by exposing the electron beam to polyethylene (PE) based non-woven fabrics or polyethylene (PE)/polypropylene (PP) based non-woven fabrics, it may be allowed to use another kind of radiation beam such as gamma rays. In addition, though AMP is used for adsorbing cesium in the above described manufacturing process, stannum molybdophosphate and titanium molybdophosphate may be used instead of AMP.

Cesium adsorbed in the radioactive material adsorbent according to the present invention may be eluted and renewed in the following way. The cesium adsorbent so fabricated as described above may be immersed in 50 mL of cesium solution with a concentration of 1 ppm density for 24 hours, and then cesium may be removed by 97%. Next, the cesium adsorbent used for the above adsorption process may be immersed in 5 mL of ammonium nitrate solution with a concentration of 5M. As a result, cesium may be eluted into the ammonium nitrate solution and the concentration of eluted cesium was 6 ppm and the leaching rate was 100%.

The basic process of the manufacturing method according to the present invention is as described above, and then, different experiments were performed by changing the conditions including temperatures and material characteristics in order to verify the effectiveness of this manufacturing process. The results of representative experimental examples are shown in Table 1 and Table 2.

TABLE 1

| | No. | trunk polymer | Graft | Molybdate | Support | Conditioning |
|---|---|---|---|---|---|---|
| Mo cellulose | 1 | cellulose | P-2M | Na salt | sulfate | No |
| Phosphorus Molybdenum PE/PP① | 2 | PE/PP | P-2M | Na salt | sulfate | No |
| Phosphorus Molybdenum PE/PP② | | PE/PP | P-2M | Na salt | sulfate | ammonium nitrate |
| Phosphorus Molybdenum Cellulose① | 3 | cellulose | P-2M | Na salt | sulfate | No |
| Phosphorus Molybdenum Cellulose② | | cellulose | P-2M | Na salt | sulfate | ammonium nitrate |
| Phosphorus Molybdenum PE/PP③ | 4 | PE/PP | P-2M | NH4 salt | sulfate | No |
| Phosphorus Molybdenum PE/PP④ | | PE/PP | P-2M | NH4 salt | sulfate | ammonium nitrate |
| Phosphorus Molybdenum PE/PP⑤ | 5 | PE/PP | GMA | NH4 salt | sulfate | ammonium nitrate |
| Ammonium Molybdophosphoric Acid-AN PE/PP① | 6 | PE/PP | AN | NH4 salt (5%) | | No |
| Ammonium Molybdophosphoric Acid-AN PE/PP② | | PE/PP | AN | NH4 salt (5%) | | No |
| Ammonium Molybdophosphoric Acid-AN PE/PP③ | | PE/PP | AN | NH4 salt (5%) | | No |
| Ammonium Molybdophosphoric Acid-AN PE/PP④ | | PE/PP | AN | NH4 salt (5%) | | sea water |
| Ammonium Molybdophosphoric Acid-AN PE/PP⑤ | 7 | PE/PP | AN | NH4 salt (0.1%) | | No |
| Ammonium Molybdophosphoric Acid-AN PE/PP⑥ | 8 | PE/PP | AN | NH4 salt (1%) | | No |
| Ammonium Molybdophosphoric Acid-AN PE/PP⑦ | 9 | PE/PP | AN | NH4 salt (2.5%) | | No |
| Ammonium Molybdophosphoric Acid-AN PE/PP⑧ | | PE/PP | AN | NH4 salt (2.5%) | | No |
| AMP-AN PE/PP 50° C. 1 h | 10 | PE/PP | AN | NH4 salt (2.5%) | | No |
| AMP-AN PE/PP 50° C. 3 h | 11 | PE/PP | AN | NH4 salt (2.5%) | | No |
| AMP-AN PE/PP 50° C. 6 h | 12 | PE/PP | AN | NH4 salt (2.5%) | | No |
| AMP-AN PE/PP 50° C. 3 h without Tw80 | 13 | PE/PP | AN | NH4 salt (2.5%) | | No |
| AMP-AN PE/PP 50° C. 3 h High-Volume Synthesis No. 1 | 14 | PE/PP | AN | NH4 salt (2.5%) | | No |
| AMP-AN PE/PP 50° C. 3 h High-Volume Synthesis No. 2 | | PE/PP | AN | NH4 salt (2.5%) | | No |
| AMP-AN PE/PP 50° C. 3 h High-Volume Synthesis No. 3 | | PE/PP | AN | NH4 salt (2.5%) | | No |
| AMP-AN PE/PP 50° C. 3 h High-Volume Synthesis No. 1 | | PE/PP | AN | NH4 salt (2.5%) | | purified water |
| AMP-AN PE/PP 50° C. 3 h High-Volume Synthesis No. 2 | | PE/PP | AN | NH4 salt (2.5%) | | purified water |
| AMP-AN PE/PP 50° C. 3 h High-Volume Synthesis No. 3 | | PE/PP | AN | NH4 salt (2.5%) | | purified water |

TABLE 2

| Conditioning | Cs Solution Matrix | Measured Value (ppb) | Dilution Ratio | Solution Concentration (ppb) | Initial Concentration (ppb) | Adsorbed Concentration (ppb) | Surface Coverage (%) | Dry Weight (mg) | Adsorbed Amount (g/kg) | No. |
|---|---|---|---|---|---|---|---|---|---|---|
| No | purified water | 6.94 | 100 | 694.3 | 999.0 | 304.7 | 30.5 | 48.4 | 0.31 | 1 |
| No | purified water | 5.96 | 100 | 595.8 | 999.0 | 403.3 | 40.4 | 21.2 | 0.95 | 2 |
| ammonium nitrate | purified water | 7.16 | 100 | 716.1 | 999.0 | 282.9 | 28.3 | 17.6 | 0.80 | |
| No | purified water | 8.55 | 100 | 854.5 | 1,002.4 | 147.9 | 14.8 | 9.8 | 0.75 | 3 |
| ammonium nitrate | purified water | 9.17 | 100 | 917.0 | 1,002.4 | 85.4 | 8.5 | 7.4 | 0.58 | |
| No | purified water | 1.64 | 100 | 163.8 | 947.2 | 783.4 | 82.7 | 73.0 | 0.54 | 4 |
| ammonium nitrate | sea water | 0.96 | 1000 | 960.4 | 1059 | 98.6 | 9.3 | 48.2 | 0.10 | |
| ammonium nitrate | sea water | 0.98 | 1000 | 980.4 | 1057 | 76.6 | 7.2 | 43.6 | 0.09 | 5 |
| No | purified water | 0.09 | 1000 | 94.9 | 967.7 | 872.8 | 90.2 | 53.6 | 0.81 | 6 |
| No | water pH3 | 0.12 | 1000 | 124.3 | 968 | 843.7 | 87.2 | 60.0 | 0.70 | |
| No | sea water | 0.35 | 1000 | 349.1 | 993.2 | 644.1 | 64.9 | 52.0 | 0.62 | |
| sea water | sea water | 0.82 | 1000 | 820.5 | 1030 | 209.5 | 20.3 | 50.6 | 0.21 | |
| No | sea water | 0.93 | 1000 | 925.8 | 1007 | 81.2 | 8.1 | 28.8 | 0.14 | 7 |
| No | sea water | 0.64 | 1000 | 635.9 | 1021 | 385.1 | 37.7 | 47.6 | 0.40 | 8 |
| No | sea water | 0.17 | 1000 | 169.0 | 1028 | 859.0 | 83.6 | 42.8 | 1.00 | 9 |
| No | sea water | 2.22 | 100 | 222.0 | 859.99 | 638.0 | 74.2 | 51.4 | 0.62 | |
| No | sea water | 4.68 | 100 | 468.0 | 746.7 | 278.7 | 37.3 | 43.2 | 0.32 | 10 |
| No | sea water | 1.45 | 100 | 145.0 | 746.7 | 601.7 | 80.6 | 47.3 | 0.64 | 11 |
| No | sea water | 1.06 | 100 | 106.0 | 746.7 | 640.7 | 85.8 | 44.2 | 0.72 | 12 |
| No | sea water | 2.31 | 100 | 231.0 | 900.7 | 669.7 | 74.4 | 42.2 | 0.79 | 13 |
| No | purified water | 0.4 | 100 | 43.3 | 1,222.0 | 1178.7 | 96.5 | 44.5 | 1.32 | 14 |
| No | purified water | 3.5 | 100 | 345.7 | 1,222.0 | 876.3 | 71.7 | 28.4 | 1.54 | |
| No | purified water | 2.4 | 100 | 236.6 | 1,222.0 | 985.4 | 80.6 | 33.8 | 1.46 | |
| purified water | purified water | 0.6 | 100 | 63.6 | 1,228.5 | 1164.9 | 94.8 | 43.7 | 1.33 | |
| purified water | purified water | 3 | 100 | 301.2 | 1,228.5 | 927.4 | 75.5 | 27.0 | 1.72 | |
| purified water | purified water | 1.7 | 100 | 166.3 | 1,228.5 | 1062.2 | 86.5 | 32.4 | 1.64 | |

EXPERIMENTAL EXAMPLE 1

Figure 1:
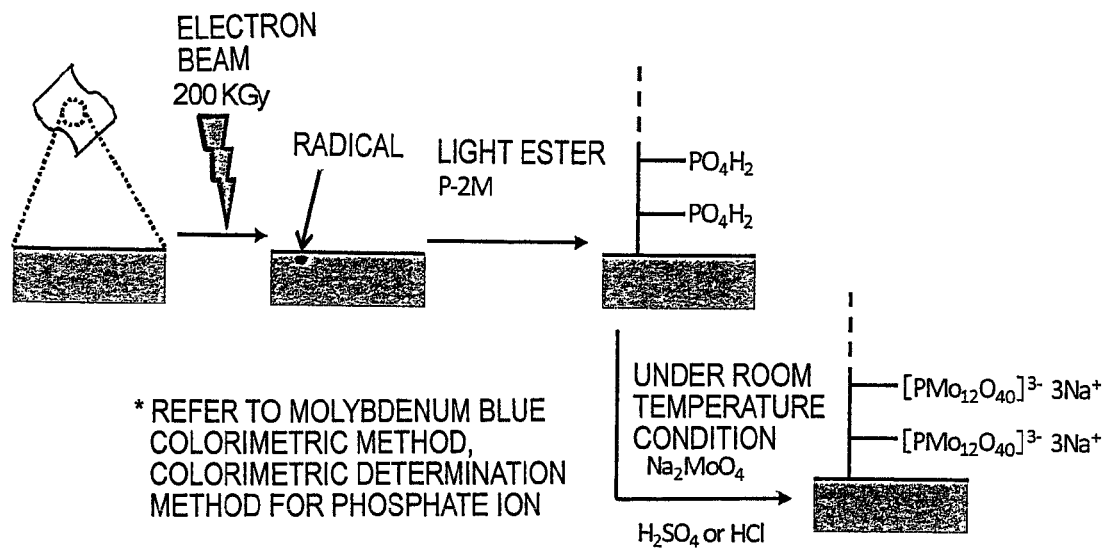
FIG. 1 is an illustration of experimental example 1 according to the present invention.

Cellulose-based non-woven fabric was irradiated with an electron of 20 kGy beam under a nitrogen atmosphere and a dry-ice temperature condition. The irradiated cellulose-based non-woven fabric was made contact to the monomer solution containing 5 wt % phosphate group bubbled with nitrogen gas, and this contact process was applied for three hours at 50° C. LIGHT ESTER P-2M available from Kyoeisha Chemical Co., Ltd. was used as the phosphate group-containing monomer. After graft polymerization, the non-woven fabric was washed by ethanol. Thus, graft polymerization of polymer chain having a phosphate group was completed at the cellulose-based non-woven fabric. The completed cellulose-based non-woven fabric with phosphate group added was immersed in 1M sulfuric acid solution containing 0.6 wt % sodium molybdate, and then this immersion process was applied for ten minutes at 40° C., and resultantly the phosphate group was transferred to the phosphomolybdic acid group. After completing the above mentioned reaction process, the cellulose-based non-woven fabric was washed by a distilled water. FIG. 1 illustrates schematically the reaction process in Experimental Example 1.

EXPERIMENTAL EXAMPLE 2

Cellulose-based non-woven fabric was irradiated with an electron beam of 200 kGy under a nitrogen atmosphere and a dry-ice temperature condition. The irradiated cellulose-based non-woven fabric was made contact to the mixture of the monomer solution containing 20 wt % phosphate groups and the methanol solution (20 wt % methanol aqueous solution) bubbled with nitrogen gas, and this contact process was applied for eight hours at 60° C. LIGHT ESTER P-2M available from Kyoeisha Chemical Co., Ltd. was used as the phosphate group-containing monomer. After graft polymerization, the non-woven fabric was washed by ethanol. Thus, graft polymerization of polymer chain having a phosphate group was completed at the cellulose-based non-woven fabric. The completed cellulose-based non-woven fabric with phosphate group added was immersed in 1M sulfuric acid solution containing 0.6 wt % sodium molybdate, and then this immersion process was applied for twenty four hours at 60° C., and resultantly the phosphate group was transferred to the phosphomolybdic acid group. After completing the above mentioned reaction process, the cellulose-based non-woven fabric was washed by a distilled water.

EXPERIMENTAL EXAMPLE 3

Cellulose-based non-woven fabric was irradiated with an electron beam of 20 kGy under a nitrogen atmosphere and a dry-ice temperature condition. The irradiated cellulose-based non-woven fabric was made contact to the monomer solution containing 5 wt % phosphate group bubbled with nitrogen gas, and this contact process was applied for three hours at 50° C. LIGHT ESTER P-2M available from Kyoeisha Chemical Co., Ltd. was used as the phosphate group-containing monomer. After graft polymerization, the non-woven fabric was washed by ethanol. Thus, graft polymerization of polymer chain having a phosphate group was completed at the cellulose-based non-woven fabric. The completed cellulose-based non-woven fabric with phosphate group added was immersed in 1M hydrochloric acid solution containing 0.6 wt % sodium molybdate, and then this immersion process was applied for twenty four hours at 40° C., and resultantly the phosphate group was transferred to the phosphomolybdic acid group. After completing the above mentioned reaction process, the cellulose-based non-woven fabric was washed by a distilled water.

EXPERIMENTAL EXAMPLE 4

Cellulose-based non-woven fabric was irradiated with an electron beam of 200 kGy under a nitrogen atmosphere and a dry-ice temperature condition. The irradiated cellulose-based non-woven fabric was made contact to the mixture of the monomer solution containing 20 wt % phosphate groups and the methanol solution (20 wt % methanol aqueous solution) bubbled with nitrogen gas, and this contact process was applied for three hours at 40° C. LIGHT ESTER P-2M available from Kyoeisha Chemical Co., Ltd. was used as the phosphate group-containing monomer. After graft polymerization, the non-woven fabric was washed by ethanol. Thus, graft polymerization of polymer chain having a phosphate group was completed at the cellulose-based non-woven fabric. The completed cellulose-based non-woven fabric with phosphate group added was immersed in 1M sulfuric acid solution containing 6 wt % ammonium molybdate, and then this immersion process was applied for twenty four hours at 60° C., and resultantly the phosphate group was transferred to the phosphomolybdic acid group. After completing the above mentioned reaction process, the cellulose-based non-woven fabric was washed by a distilled water.

EXPERIMENTAL EXAMPLE 5

Cellulose-based non-woven fabric was irradiated with an electron beam of 200 kGy under a nitrogen atmosphere and a dry-ice temperature condition. The irradiated cellulose-based non-woven fabric was made contact to the emulsion of glycidyl methacrylate and water (containing 20 wt % glycidyl methacrylate and 0.5 wt % Tween20) bubbled with nitrogen gas, and this contact process was applied for three hours at 40° C. LIGHT ESTER P-2M available from Kyoeisha Chemical Co., Ltd. was used as the phosphate group-containing monomer. After graft polymerization, the non-woven fabric was washed by using ethanol. The epoxy group of glycidyl methacrylate formed by graft polymerization in the PE/PP non-woven fabric and 85% phosphate aqueous solution was reacted together for twenty four hours at 60° C., and thus the epoxy group was converted into the phosphate group. The completed cellulose-based non-woven fabric with phosphate group added was immersed in 1M sulfuric acid solution containing 6 wt % ammonium molybdate, and then this immersion process was applied for twenty four hours at 60° C., and resultantly the phosphate group was transferred to the phosphomolybdic acid group. After completing the above mentioned reaction process, the cellulose-based non-woven fabric was washed by distilled water.

EXPERIMENTAL EXAMPLE 6

Figure 2:
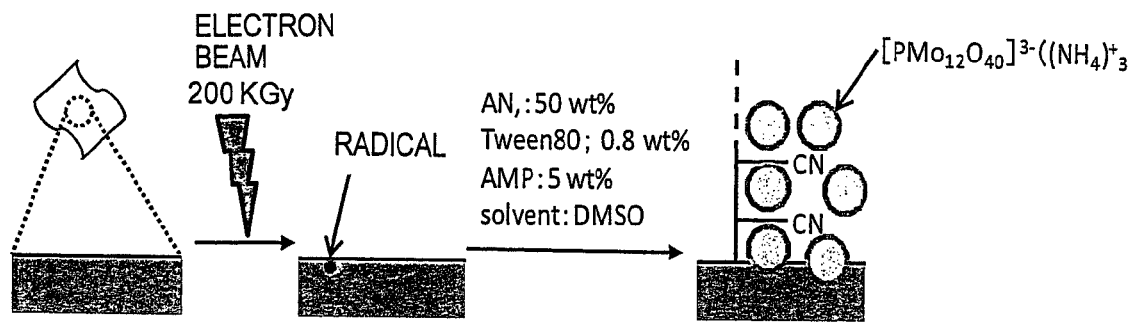
FIG. 2 is an illustration of experimental example 6 according to the present invention.

PE/PP based non-woven fabric was irradiated with an electron beam of 200 kGy under a nitrogen atmosphere and a dry-ice temperature condition. Acrylonitrile, DMSO, Tween80, and ammonium molybdophosphate were mixed with a weight ratio 50:50:0.8:5 to obtain a monomer solution. As ammonium molybdophosphate is not completely soluble into DMSO, the contents in the containers used in the subsequent processes were well stirred so that ammonium molybdophosphate may be well dispersed in DMSO, and that ammonium molybdophosphate may be moved preferably to the container to be used in the subsequent process. The irradiated PE/PP based non-woven fabric to which the electron beam was exposed was made contact to the monomer solution bubbled with nitrogen gas, and this contact process was applied for twenty four hours at 60° C. The non-woven fabric so obtained as to hold ammonium molybdophosphate was immersed in toluene, and then washed. After washed in toluene, the non-woven fabric holding ammonium molybdophosphate so obtained as described above was dried by a vacuum drier after air drying in the draft. FIG. 2 illustrates schematically the reaction process in Experimental Example 6. The reaction process in Experimental Example 7 or later will be described in the same picture as shown in FIG. 2.

EXPERIMENTAL EXAMPLE 7

PE/PP based non-woven fabric was irradiated with an electron beam of 200 kGy under a nitrogen atmosphere and a dry-ice temperature condition. Acrylonitrile, DMSO, Tween80, and ammonium molybdophosphate were mixed with a weight ratio 50:50:0.8:0.1 to obtain a monomer solution. As ammonium molybdophosphate is not completely soluble into DMSO, the contents in the containers used in the subsequent processes were well stirred so that ammonium molybdophosphate may be well dispersed in DMSO, and that ammonium molybdophosphate may be moved preferably to the container to be used in the subsequent process. The irradiated PE/PP based non-woven fabric was made contact to the monomer solution bubbled with nitrogen gas, and this contact process was applied for twenty four hours at 60° C. The non-woven fabric so obtained as to hold ammonium molybdophosphate was immersed in toluene, and then washed. After washed in toluene, the non-woven fabric holding ammonium molybdophosphate so obtained as described above was dried by a vacuum drier after air drying in the draft.

EXPERIMENTAL EXAMPLE 8

PE/PP based non-woven fabric was irradiated with an electron beam of 200 kGy under a nitrogen atmosphere and a dry-ice temperature condition. Acrylonitrile, DMSO, Tween80, and ammonium molybdophosphate were mixed with a weight ratio 50:50:0.8:2.5 to obtain a monomer solution. As ammonium molybdophosphate is not completely soluble into DMSO, the contents in the containers used in the subsequent processes were well stirred so that ammonium molybdophosphate may be well dispersed in DMSO, and that ammonium molybdophosphate may be moved preferably to the container to be used in the subsequent process. The irradiated PE/PP based non-woven fabric was made contact to the monomer solution bubbled with nitrogen gas, and this contact process was applied for twenty four hours at 60° C. The non-woven fabric so obtained as to hold ammonium molybdophosphate was immersed in toluene, and then washed. After washed in toluene, the non-woven fabric holding ammonium molybdophosphate so obtained as described above was dried by a vacuum drier after air drying in the draft.

EXPERIMENTAL EXAMPLE 9

PE/PP based non-woven fabric was irradiated with an electron beam of 200 kGy under a nitrogen atmosphere and a dry-ice temperature condition. Acrylonitrile, DMSO, Tween80, and ammonium molybdophosphate were mixed with a weight ratio 50:50:0.8:2.5 to obtain a monomer solution. As ammonium molybdophosphate is not completely soluble into DMSO, the contents in the containers used in the subsequent processes were well stirred so that ammonium molybdophosphate may be well dispersed in DMSO, and that ammonium molybdophosphate may be moved preferably to the container to be used in the subsequent process. The irradiated PE/PP based non-woven fabric was made contact to the monomer solution bubbled with nitrogen gas, and this contact process was applied for twenty one hour at 50° C. The non-woven fabric so obtained as to hold ammonium molybdophosphate was immersed in toluene, and then washed. After washed in toluene, the non-woven fabric holding ammonium molybdophosphate so obtained as described above was dried by a vacuum drier after air drying in the draft.

EXPERIMENTAL EXAMPLE 10

PE/PP based non-woven fabric was irradiated with an electron beam of 200 kGy under a nitrogen atmosphere and a dry-ice temperature condition. Acrylonitrile, DMSO, Tween80, and ammonium molybdophosphate were mixed with a weight ratio 50:50:0.8:2.5 to obtain a monomer solution. As ammonium molybdophosphate is not completely soluble into DMSO, the contents in the containers used in the subsequent processes were well stirred so that ammonium molybdophosphate may be well dispersed in DMSO, and that ammonium molybdophosphate may be moved preferably to the container to be used in the subsequent process. The irradiated PE/PP based non-woven fabric was made contact to the monomer solution bubbled with nitrogen gas, and this contact process was applied for twenty three hours at 50° C. The non-woven fabric so obtained as to hold ammonium molybdophosphate d was immersed in toluene, and then washed. After washed in toluene, the non-woven fabric holding ammonium molybdophosphate so obtained as described above was dried by a vacuum drier after air drying in the draft.

EXPERIMENTAL EXAMPLE 11

PE/PP based non-woven fabric was irradiated with an electron beam of 200 kGy under a nitrogen atmosphere and a dry-ice temperature condition. Acrylonitrile, DMSO, Tween80, and ammonium molybdophosphate were mixed with a weight ratio 50:50:0.8:2.5 to obtain a monomer solution. As ammonium molybdophosphate is not completely soluble into DMSO, the contents in the containers used in the subsequent processes were well stirred so that ammonium molybdophosphate may be well dispersed in DMSO, and that ammonium molybdophosphate may be moved preferably to the container to be used in the subsequent process. The irradiated PE/PP based non-woven fabric was made contact to the monomer solution bubbled with nitrogen gas, and this contact process was applied for twenty six hours at 50° C. The non-woven fabric so obtained as to hold ammonium molybdophosphate was immersed in toluene, and then washed. After washed in toluene, the non-woven fabric holding ammonium molybdophosphate so obtained as described above was dried by a vacuum drier after air drying in the draft.

EXPERIMENTAL EXAMPLE 12

PE/PP based non-woven fabric was irradiated with an electron beam of 200 kGy under a nitrogen atmosphere and a dry-ice temperature condition. Acrylonitrile, DMSO, and ammonium molybdophosphate were mixed with a weight ratio 50:50:2.5 to obtain a monomer solution. As ammonium molybdophosphate is not completely soluble into DMSO, the contents in the containers used in the subsequent processes were well stirred so that ammonium molybdophosphate may be well dispersed in DMSO, and that ammonium molybdophosphate may be moved preferably to the container to be used in the subsequent process. The irradiated PE/PP based non-woven fabric was made contact to the monomer solution bubbled with nitrogen gas, and this contact process was applied for twenty three hours at 50° C. The non-woven fabric so obtained as to hold ammonium molybdophosphate was immersed in toluene, and then washed. After washed in toluene, the non-woven fabric holding ammonium molybdophosphate so obtained as described above was dried by a vacuum drier after air drying in the draft.

EXPERIMENTAL EXAMPLE 13

NF was cut into rectangles with dimensions of 30 cm×10 m, which were irradiated with 200 kGy of $^{60}$Co gamma rays under a nitrogen atmosphere and a dry-ice temperature condition. Acrylonitrile, DMSO, and ammonium molybdophosphate were mixed with a weight ratio 50:50:0.8:2.5 to obtain a monomer solution. As ammonium molybdophosphoric acid is not completely soluble into DMSO, the contents in the containers used in the subsequent processes were well stirred so that ammonium molybdophosphate may be well dispersed in DMSO, and that ammonium molybdophosphate may be moved preferably to the container to be used in the subsequent process. The irradiated PE/PP based non-woven fabric was made contact to the monomer solution in the reaction chamber having 30 L volume bubbled with nitrogen gas, and this contact process was applied for twenty three hours at 50° C. The non-woven fabric so obtained as to hold ammonium molybdophosphate was immersed in toluene, and then washed. After washed in toluene, the non-woven fabric holding ammonium molybdophosphate so obtained as described above was dried by a vacuum drier after air drying in the draft.

Though adsorption of cesium has been described above, the adsorbent manufactured using ammonium molybdophosphate can provide a selectivity for cesium by conditioning the adsorbent with a solution including stannous ion, and thus can control the selectivity for cesium and strontium according to the conditioning specification.

It will be appreciated that cesium included in the waste water contaminated with radioactive materials may be removed by a very simple method even in case of unforeseen event in which waste water contaminated with radioactive materials could be leaked at the nuclear power plant and the like as cesium can be removed at a higher rate in the waste water contaminated with radioactive materials including cesium in large quantities. Therefore, it will be appreciated that the water to be supplied to swimming pools and farm fields can be decontaminated easily and with lower cost so that its contaminated level may be reduced to be equal to or lower than a regulation value, even in such a case of unforeseen event that cesium could be released into the atmosphere.

What is claimed is:

1. A manufacturing method of cesium adsorbent comprises;
    generating radical by electron beam exposure to polyethylene (PE) based non-woven fabrics or polyethylene (PE)/polypropylene (PP) based non-woven fabric;
    forming a graft polymerization product by contacting said non-woven fabrics to a monomer solution manufactured by mixing acrylonitrile (AN), solvent for AN, surfactant and one selected from a group including stannum molybdophosphate, titanium molybdophosphate and ammonium molybdophosphate n-hydrate (AMP) with a relevant weight ratio;
    immersing the graft polymerization product in toluene, and washing said non-woven fabric entirely; and
    drying in a vacuum said graft polymerization product in which said AMP is supported after completing washing with toluene.

2. The manufacturing method of cesium adsorbent according to claim 1, wherein a period of time for immersing said graft polymerization product in toluene is a longest period of time during which a yellow-green pigment is not found to flow out from the said graft polymerization product.

3. A manufacturing method of cesium adsorbent comprises;

generating radical by irradiation of electron beam to polyethylene (PE) based non-woven fabrics or polyethylene (PE)/polypropylene (PP) based non-woven fabric;

contacting said non-woven fabric to a monomer solution formed by mixing a graft polymerization product by contacting said non-woven fabrics to a monomer solution manufactured by mixing acrylonitrile (AN), solvent for AN, surfactant and ammonium molybdophosphate n-hydrate (AMP) with a weight ratio 50:50:0.8:2.5;

immersing the graft polymerization product in toluene, and washing said non-woven fabric entirely; and drying in a vacuum the said graft polymerization product in which said AMP is supported after completing washing with toluene.

4. The manufacturing method of cesium adsorbent according to claim 3, wherein said solvent for AN is dimethyl sulfoxide (DMSO), said surfactant may be preferably polyoxyethylene sorbitan monooleate (Tween80.)

5. The manufacturing method of cesium adsorbent according to claim 3, wherein a period of time for immersing said graft polymerization product in toluene is a longest period of time during which a yellow-green pigment is not found to flow out from the said graft polymerization product.

6. The manufacturing method of cesium adsorbent according to claim 3, wherein said PE/PP based non-woven fabric is contacted to said monomer solution while said monomer solution is bubbled with nitrogen gas.

\* \* \* \* \*